US012729991B2

(12) United States Patent
Battle et al.

(10) Patent No.: US 12,729,991 B2
(45) Date of Patent: Sep. 8, 2026

(54) ADJUSTABLE ROTARY CUP

(71) Applicant: AMS LLC, Canton, OH (US)

(72) Inventors: Matthew Battle, Canton, OH (US); Adrian Bischoff, Chapel Hill, NC (US)

(73) Assignee: AMS LLC, Canton, OH (US)

( * ) Notice: Subject to any disclaimer, the term of this patent is extended or adjusted under 35 U.S.C. 154(b) by 93 days.

(21) Appl. No.: 18/959,856

(22) Filed: Nov. 26, 2024

(65) Prior Publication Data

US 2025/0180389 A1 Jun. 5, 2025

Related U.S. Application Data

(60) Provisional application No. 63/604,318, filed on Nov. 30, 2023.

(51) Int. Cl.
*G01F 11/28* (2006.01)
*A61J 1/22* (2006.01)
*G01F 11/42* (2006.01)

(52) U.S. Cl.
CPC ............... *G01F 11/286* (2013.01); *A61J 1/22* (2013.01); *G01F 11/42* (2013.01)

(58) Field of Classification Search
CPC ...... G01F 11/286; G01F 11/263; G01F 11/28; G01F 11/42; G01F 11/30; G01F 11/32; G01F 11/44; A61J 1/22; A61J 7/0046
USPC ................. 222/207, 209, 211–213, 424, 548
See application file for complete search history.

(56) References Cited

U.S. PATENT DOCUMENTS 4,474,312 A * 10/1984 Donoghue ............. B65D 41/56 222/207
5,330,081 A * 7/1994 Davenport ............ G01F 11/286 222/207
12,449,293 B2 * 10/2025 Bartl ...................... B65D 41/02

* cited by examiner

*Primary Examiner* — David J Walczak

(57) ABSTRACT

An adjustable measured fluid dispenser for dispensing a fluid from a storage container. The adjustable measured fluid dispenser includes a measurement cap having a fillable chamber. The fillable chamber has an adjustable maximum retainable volume. The maximum retainable volume is adjusted by changing an axial position of the measurement cap relative to a stopper positioned within a neck of the storage container. The axial position of the measurement cap is changed by rotating the measurement cap, which open and closes a fluid passage between the fillable volume and the liquid in the storage container.

19 Claims, 6 Drawing Sheets

34
26
28

38
34
20
58
56
62
36
66
66
50
26

ADJUSTABLE ROTARY CUP

RELATED APPLICATIONS

This application claims the benefit of U.S. Provisional Application No. 63/604,318 filed on Nov. 30, 2023, which is hereby incorporated herein by reference in its entirety.

TECHNICAL FIELD

The present disclosure relates generally to fluid dispensers, and more particularly to a fluid dispenser for measuring and dispensing fluid contained in a container.

BACKGROUND

There are many ways to measure fluid from a container. One such conventional way is by using a measuring cup including delineated markers along the side of the cup to visually indicate to a user how much fluid is contained therein and dispensed from a bottle. The delineations on measuring cups are often very small and integrally formed into the plastic, which may cause some users difficulty in visually seeing the demarcations on the cup, and which could result in an improper dosage of medicine, for example.

SUMMARY

The present disclosure provides an adjustable measured fluid dispenser for dispensing a fluid from a storage container using a measurement cap having a fillable volume with a maximum retainable volume determined based on an axial position of the measurement cap relative to a stopper positioned in a neck of the storage container.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

Figures 1, 2:
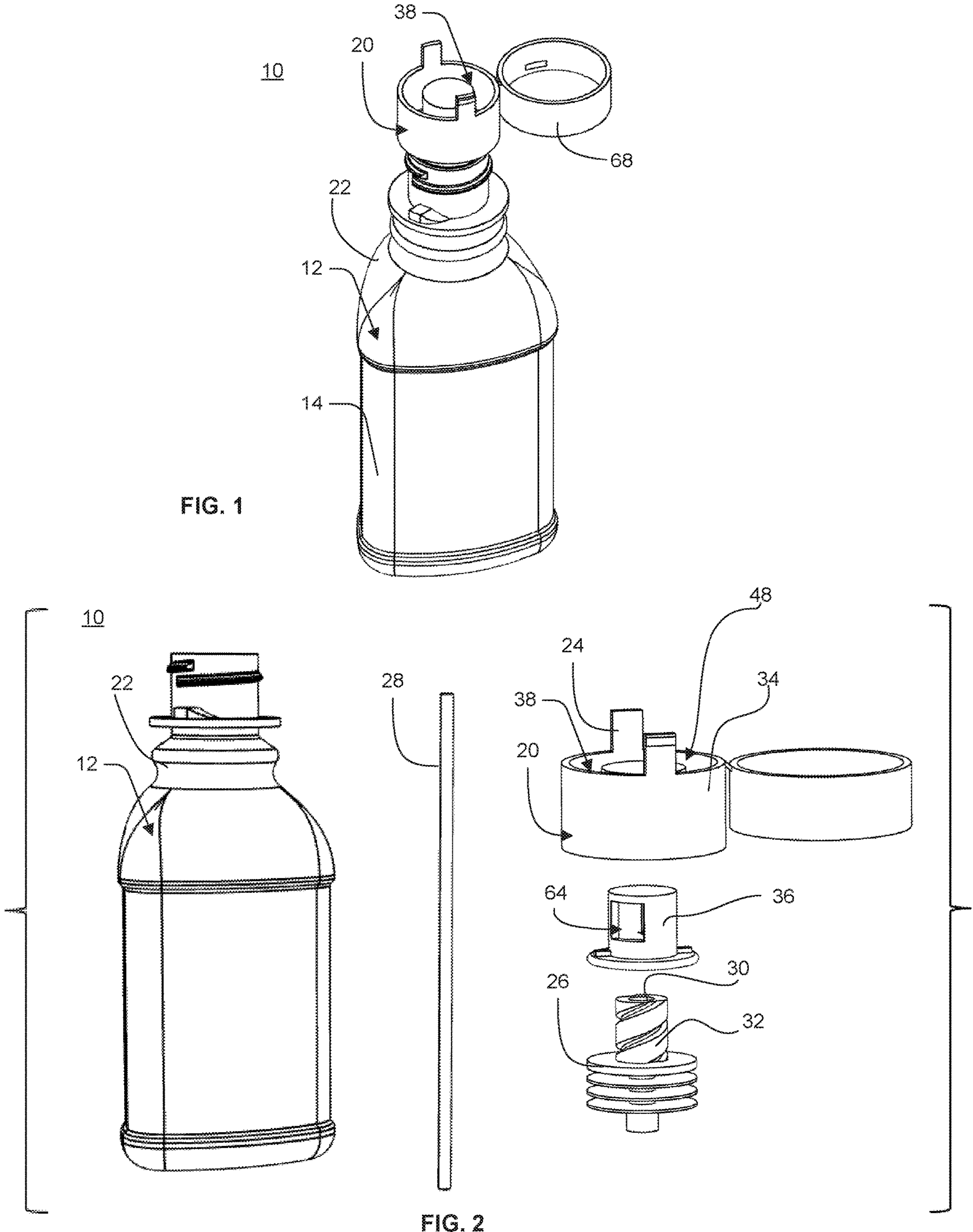
FIG. 1 is a perspective view of an exemplary adjustable liquid medicine dispenser including an adjustable measured fluid dispenser and a storage container.
FIG. 2 is an exploded perspective view of FIG. 1.

The principles and aspects of the present disclosure have particular application to fluid dispensers for use with liquid medications, and thus will be described below chiefly in this context. It is understood, however, that the principles and aspects of the present disclosure may be applicable for other applications for other types of fluids where it is desirable to measure and dispense a preselected quantity of fluid from a container with improved accuracy and ease.

The present disclosure provides an adjustable measured fluid dispenser for dispensing a fluid from a storage container. The adjustable measured fluid dispenser includes a measurement cap having a fillable chamber with an adjustable maximum retainable volume. The maximum retainable volume is adjusted by changing an axial position of the measurement cap relative to a stopper positioned within a neck of the storage container. The axial position is changed by rotating the measurement cap, which opens and closes a fluid passage between the fillable volume and the liquid in the storage container, thereby controlling the flow of fluid into the fillable chamber.

Turning to FIGS. 1-7, an exemplary embodiment is shown of an adjustable liquid medicine dispenser 10 for dispensing measured amounts of a fluid. The adjustable liquid medicine dispenser 10 includes a storage container 12 having a storage chamber 14 for storing a fluid, and an adjustable measured fluid dispenser 20. The adjustable measured fluid dispenser 20 dispenses the fluid from the storage chamber 12 via a neck 22 of the storage container 12. For example, the storage container 12 may be a liquid medicine bottle and the stored fluid may be a liquid medicine (e.g., acetaminophen, ibuprofen, etc.).

The adjustable measured fluid dispenser 20 includes a measurement cap 24, a stopper 26, and a tube 28. The stopper 26 engages with and seats within the neck 22 of the storage container 12. The stopper 26 includes an internal fluid passage 30 and a threaded external projection 32. The tube 28 has a central flow path fluidly coupled to the internal fluid passage of the stopper 26, such that the fluid flow path includes the internal fluid passage. For example, the tube 28 may be at least partially inserted into the internal fluid passage 30 of the stopper. The stopper 26 creates a seal with the neck 22 of the storage container 12, such that squeezing the storage container 12 to reduce a volume of the storage chamber 14 results in the dispensed fluid being propelled through the central flow path of the tube towards a fillable chamber of the measurement cap.

The measurement cap 24 receives the dispensed fluid and includes an outer cup 34 and an inner cup 36. The dispensed fluid is received via a fluid flow path formed from the storage chamber 14, through the internal fluid passage 30 of the stopper 26, into the inner volume 58 of the inner cup 36. An upper projection 56 of the inner cup 36 is inserted into a central projection 44 of the outer cup 34, allowing the inner cup 36 to rotate relative to the outer cup 34 between an open position and a closed position. That is, the outer cup 34 and inner cup 36 include a fluid opening 50 and a fluid passage 62, respectively, that when aligned provide a flow path for liquid to move from the storage container 12 into the outer cup 34.

Figures 8, 9:
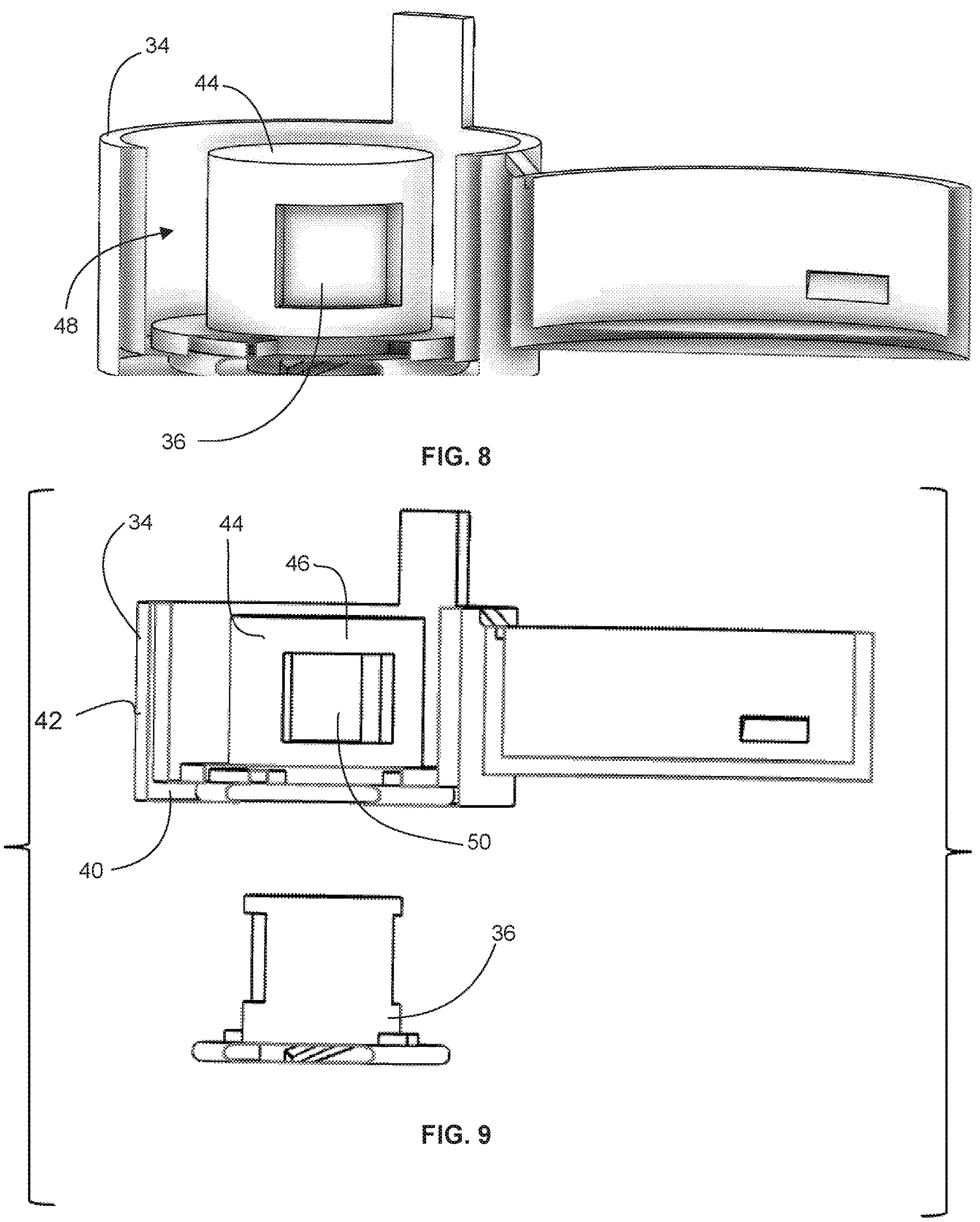
FIG. 8 is a cut away view of the inner cup and outer cup in a closed position.
FIG. 9 is an exploded view of FIG. 8.
Figures 10, 11:
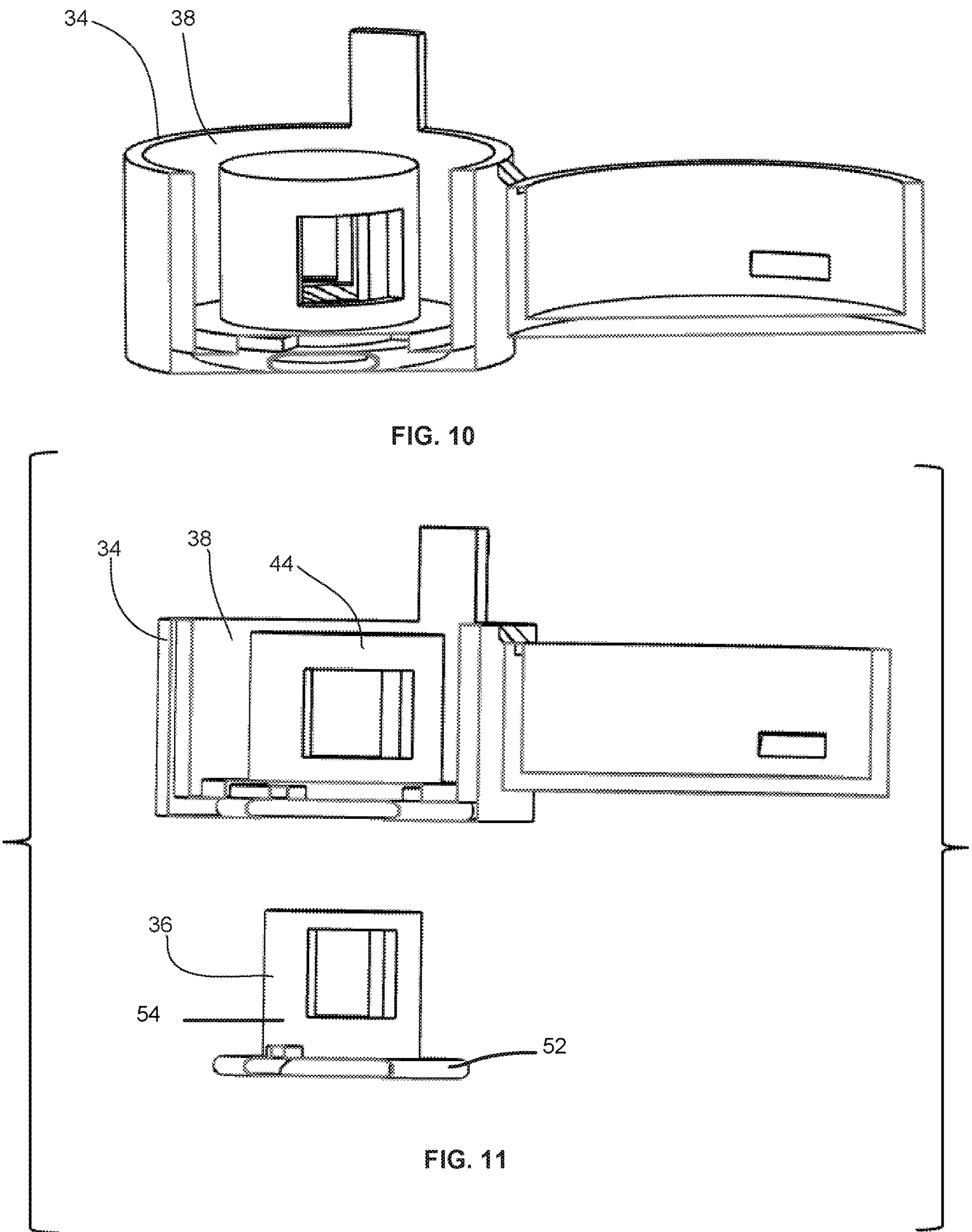
FIG. 10 is a cut away view of the inner cup and outer cup in an open position.
FIG. 11 is an exploded view of FIG. 10.

With exemplary reference to FIGS. 10 and 11, in the open position the fluid opening 50 of the central projection 44 aligns with the fluid passage 62 of the inner cup 36, extending the fluid flow path to the fillable chamber 38 of the outer cup 34. Conversely, as shown in FIGS. 8 and 9, in the closed position, the fluid opening 50 of the central projection 44 is misaligned with the fluid passage 62 of the inner cup 36, blocking fluid flow to the fillable chamber 38. FIG. 11 shows the inner cup 36 removed from the outer cup 34 so that the alignment of the fluid passage 62 and the fluid opening 50 from FIG. 10 is visible. Similarly, FIG. 9 shows the inner cup 36 removed from the outer cup 34 so that the misalignment of the fluid passage 62 and the fluid opening 50 from FIG. 8 is visible.

The outer cup 34 retains the dispensed fluid delivered from the storage container 12 in a fillable chamber 38. The outer cap 34 includes a base 40 and an outer wall 42 extending upward from the base 40, forming the fillable chamber 38. Within the fillable chamber 38, a central projection 44 extends upward from the base 40, formed by an inner wall 46. The central projection 44 has an interior volume 48 and includes a fluid opening 50 in the inner wall 46, providing a passage between the fillable chamber 38 and the interior volume 48.

The inner cup 36 includes a foot 52 and a control wall 54 extending upward from the foot 52, forming an upper projection 56. The control wall 54 defines an inner volume 58 within the upper projection 56, separated from the external volume outside the inner cup 36. The control wall 54 includes a fluid passage 62 that allows fluid communication between the inner volume 58 and the external environment.

The upper projection 56 of the inner cup 36 is designed to fit within the central projection 44 of the outer cup 34. This arrangement allows the inner cup 36 to rotate relative to the outer cup 34. By rotating the inner cup 36, the fluid passage 62 can be aligned or misaligned with the fluid opening 50 of the central projection 44, thereby opening or closing the fluid flow path to the fillable chamber 38.

When the inner cup 36 is rotated relative to the outer cup 34 into the open position, the fluid passage 62 in the control wall 54 aligns with the fluid opening 50 in the inner wall 46 of the central projection 44. This alignment creates a continuous fluid flow path from the storage chamber 14, through the stopper 26, into the inner volume 58 of the inner cup 36, and into the fillable chamber 38 of the outer cup 34. Conversely, rotating the inner cup 36 into the closed position misaligns the fluid passage 62 and the fluid opening 50, effectively blocking the flow of fluid into and out of the fillable chamber 38 from the storage container 14.

In addition to opening and closing the flow path, the inner cup 36 also engages with the stopper 26 to determine a maximum retainable volume of the dispensed fluid retained by the fillable chamber 38. The inner cup 36 includes a foot 52 and a control wall 54 extending from the foot 52. The control wall 54 forms an upper projection 56 having an inner volume 58 that is separated by the control wall 54 from an external volume outside of the inner cup 36. A fluid passage 62 in the control wall 54 provides fluid communication between the inner volume 58 and the external volume. A threaded inner surface 64 on the control wall 54 threadably engages with the threaded external projection 32 of the stopper 26. This engagement allows the inner cup 36 to be axially adjustable relative to the stopper 26.

The threaded engagement between the threaded inner surface 64 of the control wall 54 and the threaded external projection 32 of the stopper 26 allows the inner cup 36 to move axially relative to the stopper 26 when rotated. By rotating the inner cup 36 (typically via the outer cup 34), the user can adjust the axial position of the inner cup 36. This axial movement changes the relative height between the base 40 of the outer cup 34 (which forms the floor of the fillable chamber 38) and the top of the stopper 26. As a result, the maximum volume that the fillable chamber 38 can retain before fluid begins to flow back into the storage chamber 14 is adjusted. For example, a user may squeeze the storage container 14 so that the fillable chamber 38 is filled with more than the maximum retainable volume. When this happens, the height of the dispensed fluid within the fillable chamber 38 will be above a height of the opening of the stopper into the internal fluid passage 30. For this reason, when the user stops squeezing the storage chamber 14 and pressure in the storage chamber 14 is reduced, the dispensed fluid flows from the fillable chamber 38 back into the internal fluid passage 30 of the stopper 26 and into the storage chamber 14, reducing the volume of the dispensed fluid in the fillable chamber 38 to the maximum retainable volume of the fillable chamber 38.

Figure 3:
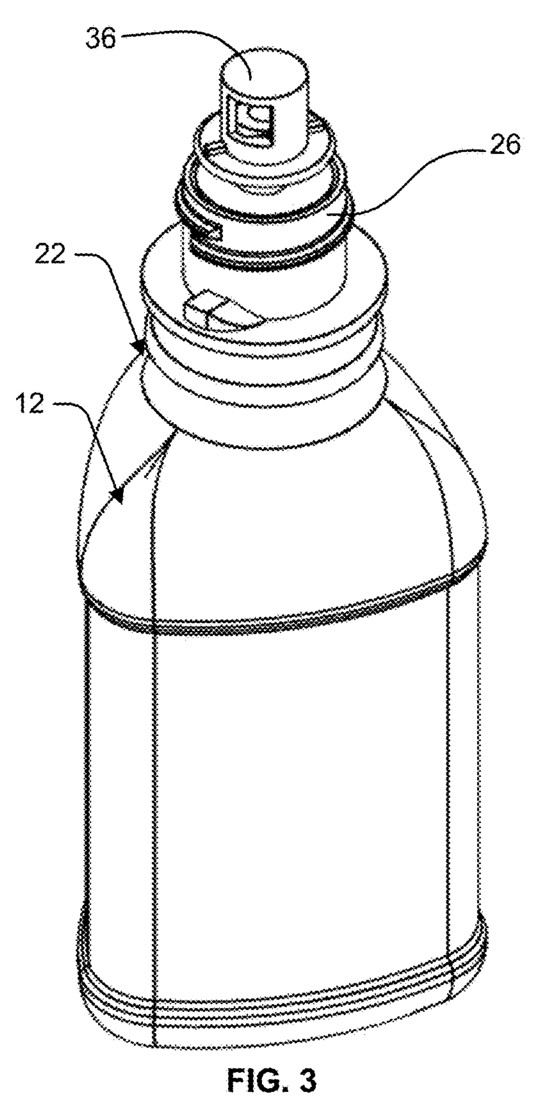
FIG. 3 is a top perspective view of the adjustable liquid medicine dispenser of FIG. 1 with the outer cap removed.
Figure 4:
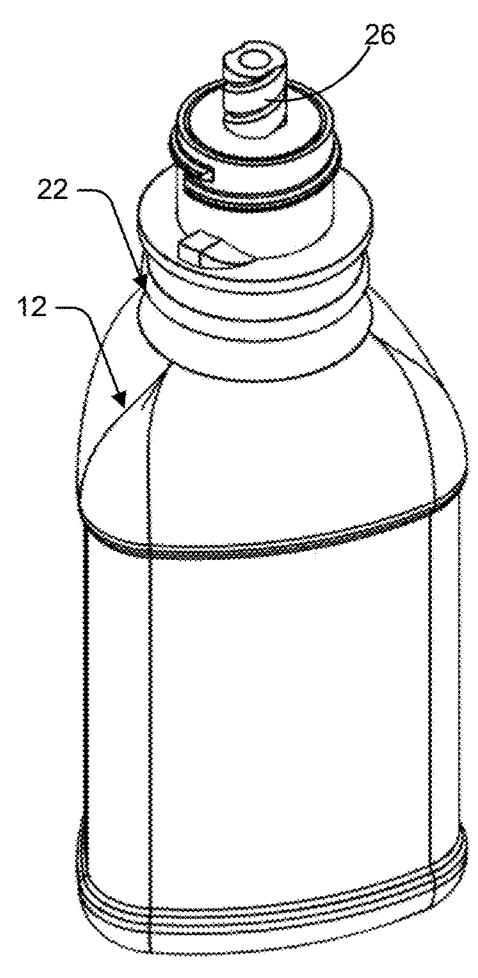
FIG. 4 is a top perspective view of the adjustable liquid medicine dispenser of FIG. 1 with the outer cup and inner cup removed.
Figure 5:
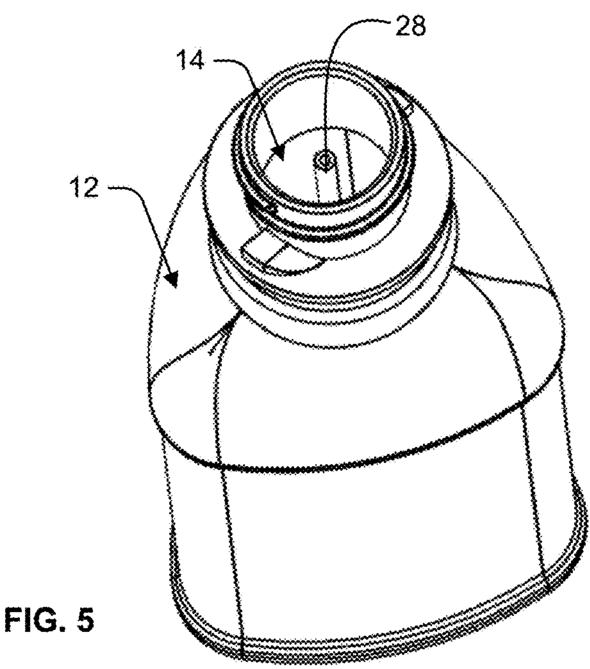
FIG. 5 is top perspective view of the storage container and the tube of FIG. 1.
Figures 6, 7:
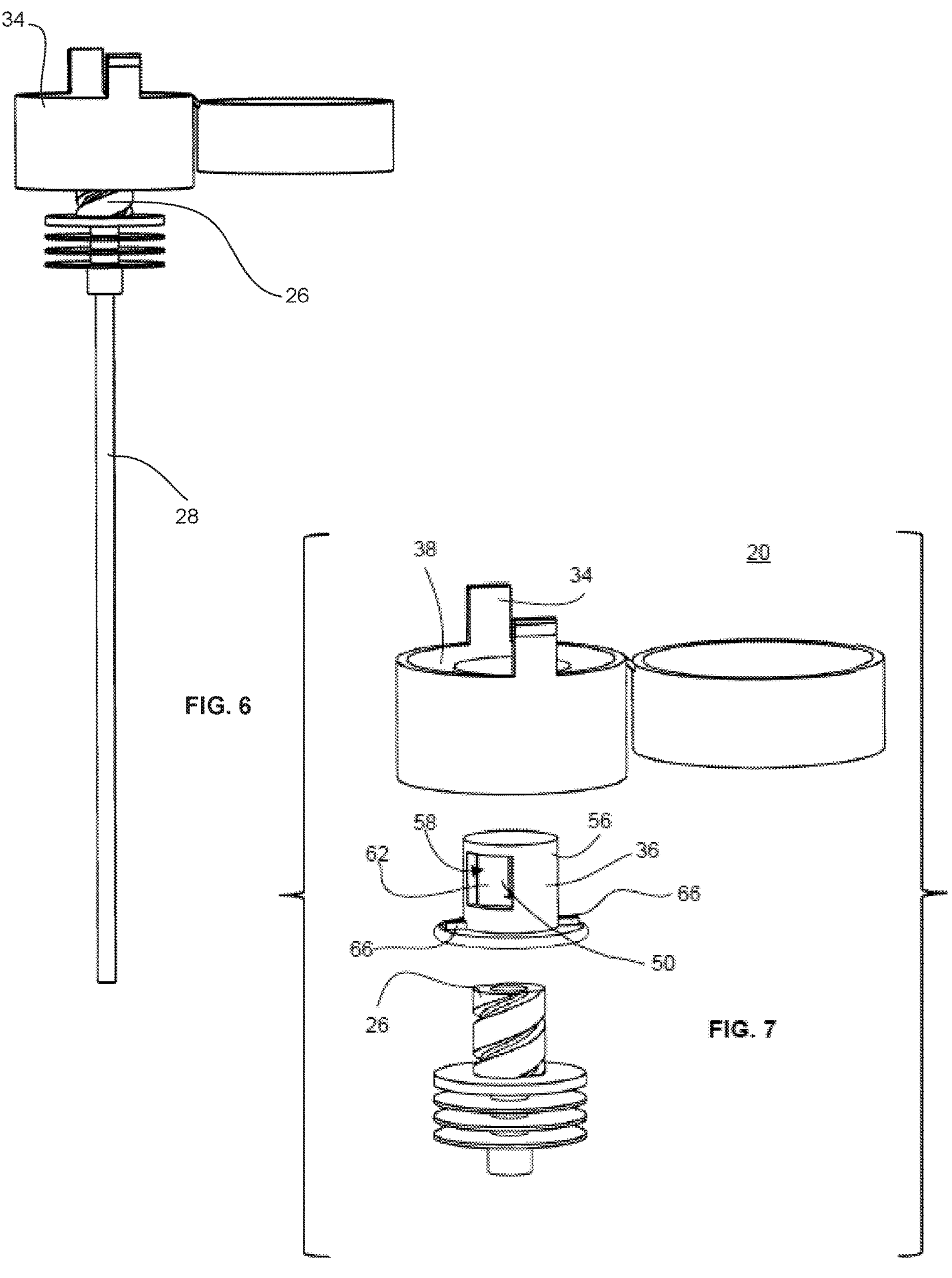
FIG. 6 is a side perspective view of the measurement cup and the tube of FIG. 1.
FIG. 7 is an exploded view of the measurement cap of FIG. 1.

Turning to FIGS. 3, 4, and 5, as described above the axial position of the inner cup 36 relative to the stopper 26 determines the maximum retainable volume of the dispensed fluid retained by the fillable chamber 38. This is accomplished by allowing the fluid within the fillable chamber 38 to flow back through the internal fluid passage 30 into the storage chamber 14. That is, the floor of the fillable chamber (i.e., the base 40) is raised and lowered relative to the top of the stopper 26 by rotating the inner cup relative to the stopper 26. This changes a height of the top of the stopper 26 relative to the floor of the fillable chamber. This results in a larger height of liquid being maintained in the fillable chamber 38 before the fluid flows back down the tube 28 into the storage chamber 14.

The inner cup 36 may be removable from the stopper 26 by rotating the inner cup 36 relative to the stopper 26. The rotation of the inner cup 36 relative to the stopper 26 adjusts an axial position of the inner cup 36 relative to the stopper 26, such that the inner cup 36 may threadably disengage with the stopper 26. The inner cup 36 may rotate relative to the stopper 26 when the outer cup 34 rotates relative to the stopper 26. In this way, the outer cup 34 may be rotated to rotate the inner cup 36 relative to the stopper 26 to remove the inner cup 36 from the stopper 26. When rotating the outer cup 34 in this manner, the outer cup 34 may rotate relative to the inner cup 36 as well, such that the measurement cap 24 is in the closed position.

The measurement cap 24 may include limiting structures 66, such as protruding tabs or stops on the inner cup 36 and corresponding features on the outer cup 34. These limiting structures are designed to restrict the rotational movement of the inner cup 36 relative to the outer cup 34 to a predetermined range (e.g., 90 degrees). When the limiting structures 66 are engaged (i.e., when the inner cup 36 has rotated to the extent allowed by the limiting structures), further rotation of the outer cup 34 causes both the inner cup 36 and outer cup 34 to rotate together relative to the stopper 26. This simultaneous rotation adjusts the axial position of the inner cup 36 relative to the stopper 26, thereby changing the maximum retainable volume of the fillable chamber 38.

Conversely, when rotating the outer cup 34 in the opposite direction (away from the limiting structures), the outer cup 34 rotates relative to the inner cup 36, transitioning the measurement cap 24 between the open and closed positions without altering the axial position of the inner cup 36.

As is described above, rotating the outer cup 34 relative to the stopper 26 does not change an axial position of the inner cup 36 relative to the stopper 26 (1) when the limiting structures are disengaged or (2) when the limiting structures 66 are engaged and the outer cup 34 is rotated relative to the stopper 26 away from the limiting structures 66 (i.e., in the direction of rotation permitted by the limiting structures 66).

When assembling the measurement cap 24, a foot 52 of the inner cup 36 may contact the base 40 of the outer cup 34, limiting the insertion depth of the inner cup 36 into the central projection 44. This contact may prevent the inner cup 36 from moving further into the central projection 44, which could otherwise cause the ceiling of the upper projection 56 to press against and block the opening of the internal fluid passage 30 of the stopper 26. By maintaining a proper gap, the design ensures that the fluid flow path between the storage chamber 14 and the inner volume 58 of the inner cup 36 remains unobstructed.

When the inner cup 36 is inserted into the central projection 44, the foot 52 abuts the base 40 of the outer cup 34, such that movement of the inner cup into the interior volume of the central projection 44 is limited. The foot also limits axial movement of the stopper 26 relative to a ceiling of the upper projection 56 of the inner cup 36, such that an opening of the internal fluid passage 30 of the stopper is prevented from pressing against and being blocked by the ceiling of the upper projection. This ensures that the fluid flow path between the inner volume of the inner cup and the storage chamber is maintained.

The measurement cap 24 may include a safety cap 68 hinged to the outer cup 34. The safety cap 68 serves to enclose the fillable chamber 38, preventing spillage of the fluid during handling or transportation. It may also provide a barrier against contamination and can be designed with child-resistant features to enhance safety.

To facilitate dispensing of the fluid from the fillable chamber 38, the internal surfaces of the chamber may be coated with a hydrophobic material. This coating reduces the adhesion of the fluid to the chamber walls, ensuring that nearly all of the measured dose can be poured out, minimizing waste, and improving dosing accuracy. Suitable hydrophobic coatings may include food-grade silicone or fluoropolymer-based materials that are compatible with the fluid being dispensed.

The outer cap 34, inner cap 36, and stopper 26 may each be made of a single piece. That is, each of the outer cap 34, inner cap 36, and stopper 26 may separately be a monolithic structure. For example, the adjustable measured fluid dispenser 20 may be constructed using only three injection molded parts (i.e., the outer cap 34, inner cap 36, and stopper 26), the tube 28, and two seals.

To use the adjustable measured fluid dispenser 20, a user may first rotate the measurement cap 24 relative to the stopper 26 to select as a desired dosage. This is achieved by turning the outer cup 34 until the volume markings align with reference points, adjusting the axial position of the inner cup 36 and thus setting the maximum retainable volume of the fillable chamber 38.

With the dispenser in the open position, the user may then squeeze the flexible storage container 12, causing fluid to flow from the storage chamber 14, through the tube 28 and internal fluid passage 30 of the stopper 26, into the inner volume 58 of the inner cup 36, through the fluid passage 62, and into the fillable chamber 38 until the fillable chamber 38 is filled with the desired dosage.

The user may then remove the measurement cap 24 from the measurement stopper 26 and dispense the fluid from the measurement cap 24. For example, the user may consume of the fluid directly from the measurement cap 24 or the user may pour the fluid from the measurement cap into a separate container before consuming the fluid.

Figure 12:
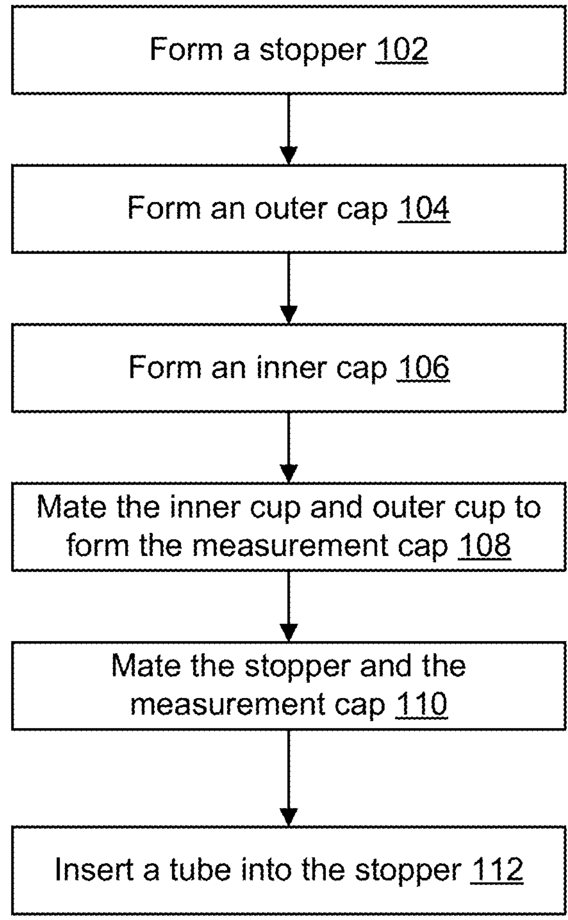
FIG. 12 is a flow diagram of an exemplary method for manufacturing an adjustable measured fluid dispenser for dispensing fluid from a storage chamber of a storage container via a neck of the storage container.

Turning to FIG. 12, a method 100 is shown for manufacturing an adjustable measured fluid dispenser 20 for dispensing fluid from a storage chamber 14 of a storage container 12 via a neck 22 of the storage container 12. In step 102, a stopper is formed by injection molding the stopper as a monolithic structure. In step 104, 106, and 108, a measurement cap is formed. In step 104, and outer cup of the measurement cap is formed by injection molding the outer cup as a monolithic structure. In step 106, an inner cup of the measurement cap is formed by injection molding the inner cup as a monolithic structure. In step 108, the inner cup and the outer cup are mated, such that the upper projection of the inner cup is located within the interior volume of the central projection of the outer cup. In step 110, the stopper is mated with the measurement cap. In step 112, a tube is inserted into the internal fluid passage of the stopper.

The inner cup 36, outer cup 34, and stopper 26 may be designed with precise tolerances to allow rotation while maintaining a secure fit. Seals, such as O-rings made of silicone or elastomeric materials, may be installed at interfaces to prevent leakage.

The storage container 12 may be any suitable container or vessel, such as a bottle or the like, that is adapted to store a fluid, such as liquid medicine or the like. The storage container 12 may be made of flexible plastic that is easy to deform and squeeze by hand. In exemplary embodiments, the storage container 12 may be separate and distinct from the adjustable measured fluid dispenser 20, in which case the adjustable measured fluid dispenser 20 may be operably couplable to, and removable from, the storage container 12.

As shown, the fillable chamber 38 is at least partially formed by internal surfaces of the outer cup 34 of the measurement cap 24 of the adjustable measured fluid dispenser 20. The outer cup 34 may be any suitable container or vessel adapted to receive and contain a preselected quantity of fluid from the storage chamber 14 of the storage container 12. The measurement cap 24 may have any suitable shape or form as may be desired for the particular application.

To provide sealing functionality between the storage chamber 14 and measurement chamber 30, the adjustable measured fluid dispenser 20 may include one or more suitable seals. For example, a gasket or O-ring seal may be disposed in a groove of the inner cup, the outer cup, and/or the stopper 26.

In the discussion above, the terms "upper", "lower", "top", "bottom," "end," "inner," "left," "right," "above," "below," "horizontal," "vertical," etc. refer to the measured fluid dispenser as viewed in a horizontal position, as shown in FIG. 1, for example. Such relative positional terms as used in this disclosure are understood to refer to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An operable connection or coupling may include the entities being integral and unitary with each other.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An adjustable measured fluid dispenser for dispensing fluid from a storage chamber of a storage container via a neck of the storage container, the fluid dispenser comprising:
- a stopper configured to engage with and seat within the neck of the storage container, the stopper including:
  - an internal fluid passage; and
  - a threaded external projection;
- a measurement cap configured to receive the dispensed fluid, the measurement cap including:
  - an outer cup configured to retain the dispensed fluid, the outer cup including:
    - a base;
    - an outer wall extending from the base, forming a fillable chamber within the outer wall;
    - a central projection formed by an inner wall extending from the base within the fillable chamber, the central projection having:
      - an interior volume within the inner wall;
      - a fluid opening in the inner wall providing a fluid passage between the fillable chamber and the interior volume; and
  - an inner cup configured to engage with the stopper to determine a maximum retainable volume of the dispensed fluid retained by the fillable chamber, the inner cup including:
    - a foot; and
    - a control wall extending from the foot and forming an upper projection, such that the control wall separates an inner volume of the inner cup from an external volume;
    - a fluid passage in the control wall providing fluid communication between the inner volume and the external volume; and
    - a threaded inner surface on the control wall configured to threadably engage with the threaded external projection of the stopper, such that:
      - the inner cup is axially adjustable relative to the stopper;
      - the axial position of the inner cup relative to the stopper determines the maximum retainable volume of the dispensed fluid retained by the fillable chamber by allowing the fluid to flow back through the internal fluid passage into the storage chamber; and
      - when threadably engaged, a fluid flow path is formed from the storage chamber, through the internal fluid passage of the stopper, into the inner volume of the inner cup;
  - wherein the upper projection of the inner cup is configured to be inserted into the central projection of the outer cup, allowing the inner cup to rotate relative to the outer cup between an open position and a closed position;

wherein in the open position, the fluid opening of the central projection aligns with the fluid passage of the inner cup, extending the fluid flow path to the fillable chamber of the outer cup; and wherein in the closed position, the fluid opening of the central projection is misaligned with the fluid passage of the inner cup, blocking fluid flow to the fillable chamber.

2. The adjustable measured fluid dispenser of claim 1, wherein:

the inner cup is removable from the stopper by rotating the inner cup relative to the stopper;

the rotation of the inner cup relative to the stopper adjusts an axial position of the inner cup relative to the stopper;

the inner cup is configured to rotate relative to the stopper when the outer cup rotates relative to the stopper; and when rotating the outer cup to rotate the inner cup relative to the stopper to remove the inner cup from the stopper, the outer cup rotates relative to the inner cup, such that the measurement cap is in the closed position.

3. The adjustable measured fluid dispenser of claim 2, wherein the measurement cap includes limiting structures comprising tabs configured to interfere with and limit a rotation of the inner cup relative to the outer cup, such that:

when the limiting structures are engaged, rotation of the outer cup relative to the stopper against the limiting structures:

prevents rotation of the inner cup relative to the outer cup; and causes the inner cup and the outer cup to rotate relative to the stopper, adjusting an axial position of the inner cup relative to the stopper;

when the limiting structures are engaged, rotation of the outer cup relative to the stopper away from the limiting structures causes the outer cup to rotate relative to the inner cup, such that the measurement cap is transitionable between the open position and the closed position; and when the limiting structures are disengaged, rotation of the outer cup relative to the stopper causes the outer cup to rotate relative to the inner cup, such that the measurement cap is transitionable between the open position and the closed position.

4. The adjustable measured fluid dispenser of claim 3, wherein the rotation of the outer cup relative to the stopper does not change an axial position of the inner cup relative to the stopper when:

the limiting structures are engaged and the outer cup is rotated relative to the stopper away from the limiting structures; or when the limiting structures are disengaged.

5. The adjustable measured fluid dispenser of claim 1, wherein, when the inner cup is inserted into the central projection, the foot abuts the base of the outer cup, such that:

movement of the inner cup into the interior volume of the central projection is limited;

an opening of the internal fluid passage is prevented from pressing against and being blocked by a ceiling of the upper projection; and the fluid flow path between the inner volume of the inner cup and the storage chamber is maintained.

6. The adjustable measured fluid dispenser of claim 1, further comprising a tube having a central flow path fluidly coupled to the internal fluid passage of the stopper, such that the fluid flow path includes the internal fluid passage.

7. The adjustable measured fluid dispenser according to claim 1, wherein the stopper is configured to create a seal with the neck of the storage container, such that squeezing the storage container to reduce a volume of the storage chamber results in the dispensed fluid being propelled through the central flow path of the tube towards the fillable chamber.

8. The adjustable measured fluid dispenser of claim 1, wherein the measurement cap further includes a safety cap hinged to the outer cup, such that the safety cap is configured to confine the fillable chamber.

9. The adjustable measured fluid dispenser according to claim 1, wherein the storage container is a liquid medicine bottle.

10. A method of dispensing fluid from the measured fluid dispenser according to claim 1 comprising:

rotating the measurement cap relative to the stopper to select as a desired dosage the maximum retainable volume of the fillable chamber;

squeezing the storage container until the fillable chamber is filled with the desired dosage;

removing the measurement cap; and dispensing the fluid from the measurement cap.

11. An adjustable liquid medicine dispenser for dispensing measured amounts of liquid medicine comprising:

a liquid medicine bottle including a storage chamber for storing the liquid medicine; and an adjustable measured fluid dispenser for dispensing the liquid medicine from the storage chamber via a neck of the liquid medicine bottle, the fluid dispenser comprising:

a stopper configured to engage with and seat within the neck of the liquid medicine bottle, the stopper including:

an internal fluid passage; and a threaded external projection;

a measurement cap configured to receive the dispensed fluid, the measurement cap including:

an outer cup configured to retain the dispensed fluid, the outer cup including:

a base;

an outer wall extending from the base, forming a fillable chamber within the outer wall;

a central projection formed by an inner wall extending from the base within the fillable chamber, the central projection having:

an interior volume within the inner wall;

a fluid opening in the inner wall providing a fluid passage between the fillable chamber and the interior volume; and an inner cup configured to engage with the stopper to determine a maximum retainable volume of the dispensed fluid retained by the fillable chamber, the inner cup including:

a foot; and a control wall extending from the foot and forming an upper projection, such that the control wall separates an inner volume of the inner cup from an external volume;

a fluid passage in the control wall providing fluid communication between the inner volume and the external volume; and a threaded inner surface on the control wall configured to threadably engage with the threaded external projection of the stopper, such that:

the inner cup is axially adjustable relative to the stopper;

the axial position of the inner cup relative to the stopper determines the maximum retainable volume of the dispensed fluid retained by the fillable chamber by allowing the fluid to flow back through the internal fluid passage into the storage chamber; and when threadably engaged, a fluid flow path is formed from the storage chamber, through the internal fluid passage of the stopper, into the inner volume of the inner cup;

wherein the upper projection of the inner cup is configured to be inserted into the central projection of the outer cup, allowing the inner cup to rotate relative to the outer cup between an open position and a closed position;

wherein in the open position, the fluid opening of the central projection aligns with the fluid passage of the inner cup, extending the fluid flow path to the fillable chamber of the outer cup; and wherein in the closed position, the fluid opening of the central projection is misaligned with the fluid passage of the inner cup, blocking fluid flow to the fillable chamber.

12. The adjustable liquid medicine dispenser of claim 11, wherein:

the inner cup is removable from the stopper by rotating the inner cup relative to the stopper;

the rotation of the inner cup relative to the stopper adjusts an axial position of the inner cup relative to the stopper;

the inner cup is configured to rotate relative to the stopper when the outer cup rotates relative to the stopper; and when rotating the outer cup to rotate the inner cup relative to the stopper to remove the inner cup from the stopper, the outer cup rotates relative to the inner cup, such that the measurement cap is in the closed position.

13. The adjustable liquid medicine dispenser of claim 12, wherein the measurement cap includes limiting structures comprising tabs configured to interfere with and limit a rotation of the inner cup relative to the outer cup, such that:

when the limiting structures are engaged, rotation of the outer cup relative to the stopper against the limiting structures:

prevents rotation of the inner cup relative to the outer cup; and causes the inner cup and the outer cup to rotate relative to the stopper, adjusting an axial position of the inner cup relative to the stopper;

when the limiting structures are engaged, rotation of the outer cup relative to the stopper away from the limiting structures causes the outer cup to rotate relative to the inner cup, such that the measurement cap is transitionable between the open position and the closed position; and when the limiting structures are disengaged, rotation of the outer cup relative to the stopper causes the outer cup to rotate relative to the inner cup, such that the measurement cap is transitionable between the open position and the closed position.

14. The adjustable liquid medicine dispenser of claim 13, wherein the rotation of the outer cup relative to the stopper does not change an axial position of the inner cup relative to the stopper when:

the limiting structures are engaged and the outer cup is rotated relative to the stopper away from the limiting structures; or when the limiting structures are disengaged.

15. The adjustable liquid medicine dispenser of claim 11, wherein, when the inner cup is inserted into the central projection, the foot abuts the base of the outer cup, such that:

movement of the inner cup into the interior volume of the central projection is limited;

an opening of the internal fluid passage is prevented from pressing against and being blocked by a ceiling of the upper projection; and the fluid flow path between the inner volume of the inner cup and the storage chamber is maintained.

16. The adjustable liquid medicine dispenser of claim 11, further comprising a tube having a central flow path fluidly coupled to the internal fluid passage of the stopper, such that the fluid flow path includes the internal fluid passage.

17. The adjustable liquid medicine dispenser according to claim 11, wherein the stopper is configured to create a seal with the neck of the liquid medicine bottle, such that squeezing the liquid medicine bottle to reduce a volume of the storage chamber results in the dispensed fluid being propelled through the central flow path of the tube towards the fillable chamber.

18. The adjustable liquid medicine dispenser of claim 11, wherein the measurement cap further includes a safety cap hinged to the outer cup, such that the safety cap is configured to confine the fillable chamber.

19. A method of manufacturing an adjustable measured fluid dispenser for dispensing fluid from a storage chamber of a storage container via a neck of the storage container, the method comprising:

forming a stopper configured to engage with and seat within the neck of the storage container by injection molding as a monolithic structure the stopper, such that the stopper includes:

an internal fluid passage; and a threaded external projection;

forming a measurement cap configured to receive the dispensed fluid by:

injection molding as a monolithic structure an outer cup configured to retain the dispensed fluid, such that the outer cup includes:

a base;

an outer wall extending from the base, forming a fillable chamber within the outer wall;

a central projection formed by an inner wall extending from the base within the fillable chamber, the central projection having:

an interior volume within the inner wall;

a fluid opening in the inner wall providing a fluid passage between the fillable chamber and the interior volume; and injection molding as a monolithic structure an inner cup configured to engage with the stopper to determine a maximum retainable volume of the dispensed fluid retained by the fillable chamber, such that the inner cup includes:

a foot; and a control wall extending from the foot and forming an upper projection, such that the control wall separates an inner volume of the inner cup from an external volume;

a fluid passage in the control wall providing fluid communication between the inner volume and the external volume; and a threaded inner surface on the control wall configured to threadably engage with the threaded external projection of the stopper, such that:

the inner cup is axially adjustable relative to the stopper;

the axial position of the inner cup relative to the stopper determines the maximum retainable volume of the dispensed fluid retained by the fillable chamber by allowing the fluid to flow back through the internal fluid passage into the storage chamber; and when threadably engaged, a fluid flow path is formed from the storage chamber, through the internal fluid passage of the stopper, into the inner volume of the inner cup;

wherein the upper projection of the inner cup is configured to be inserted into the central projection of the outer cup, allowing the inner cup to rotate relative to the outer cup between an open position and a closed position;

wherein in the open position, the fluid opening of the central projection aligns with the fluid passage of the inner cup, extending the fluid flow path to the fillable chamber of the outer cup; and wherein in the closed position, the fluid opening of the central projection is misaligned with the fluid passage of the inner cup, blocking fluid flow to the fillable chamber;

mating the inner cup and the outer cup, such that the upper projection of the inner cup is located within the interior volume of the central projection of the outer cup;

mating the stopper with the measurement cap; and inserting a tube into the internal fluid passage of the stopper.

* * * * *